United States Patent
Carnahan et al.

(10) Patent No.: US 6,588,717 B2
(45) Date of Patent: Jul. 8, 2003

(54) PLANAR ASSEMBLY SUPPORT

(76) Inventors: Garnett Carnahan, 337 E. Lindbergh, Nixa, MO (US) 65714; Caroline Carnahan, 337 E. Lindbergh, Nixa, MO (US) 65714

( * ) Notice: Subject to any disclaimer, the term of this patent is extended or adjusted under 35 U.S.C. 154(b) by 0 days.

(21) Appl. No.: 09/960,930

(22) Filed: Sep. 25, 2001

(65) Prior Publication Data

US 2002/0040956 A1 Apr. 11, 2002

Related U.S. Application Data

(63) Continuation-in-part of application No. 09/514,189, filed on Feb. 28, 2000, now abandoned.

(30) Foreign Application Priority Data

Dec. 6, 1999 (CN) ........................................ 99251954 U

(51) Int. Cl.[7] .......................... F16M 11/20; A47B 91/00
(52) U.S. Cl. ................................ 248/188.8; 248/188.1; 248/222.11
(58) Field of Search ................................. 248/519, 530, 248/910, 523, 222.11, 221.11, 221.12, 222.51, 222.52, 220.21, 220.22, 156, 188.4, 511, 518, 529, 158, 188.8, 650, 677, 415, 418; 52/165, 166, 298, 736.4; 403/187, 188, 192, 194, 199; 108/150; 297/344.22, 344.21

(56) References Cited

U.S. PATENT DOCUMENTS

| | | | | | |
|---|---|---|---|---|---|
| 4,394,097 | A | * | 7/1983 | Horlacher | 403/360 |
| 4,441,347 | A | * | 4/1984 | Taylor | 70/370 |
| 4,684,286 | A | * | 8/1987 | Itagaki | 403/407.1 |
| 5,026,010 | A | * | 6/1991 | Camarota | 248/188.1 |
| 5,037,232 | A | * | 8/1991 | Pakdipanichpong | 403/199 |
| 5,497,965 | A | * | 3/1996 | Mathieu, Jr. | 248/159 |
| 5,826,850 | A | * | 10/1998 | Goldsmith | 248/415 |
| 5,893,541 | A | * | 4/1999 | Michaelson | 248/159 |
| 6,036,036 | A | * | 3/2000 | Bilani | 215/216 |
| 6,116,183 | A | * | 9/2000 | Crow et al. | 114/363 |
| 6,196,505 | B1 | * | 3/2001 | Wainwright | 248/188.1 |

* cited by examiner

*Primary Examiner*—Gwendolyn Baxter
(74) *Attorney, Agent, or Firm*—Rabin & Berdo, P.C.

(57) ABSTRACT

A planar assembly support includes a pillar and bed fixable on a surface. A bed center hole is provided with an inner screw thread. An inner locking member has a protruded retaining ring and an outer screw thread on a lower portion outer peripheral face, and fixedly locks on the bed via a threaded connection with the inner screw thread of the bed. The outer screw thread may consist of at least two sections of a convex spiral constituting less than a complete revolution. The pillar and inner locking member can be dismantled together from the bed. The bed left on the surface occupies a smaller space and, therefore, reduces the risk of tripping, while providing convenient mounting and dismantling without damage to the surface. A lock/release mechanism may be provided to prevent inadvertent rotation of the pillar in an unscrewing direction with respect to the bed.

8 Claims, 6 Drawing Sheets

PLANAR ASSEMBLY SUPPORT

CROSS-REFERENCE TO RELATED APPLICATIONS

This application is filed as a continuation-in-part of application Ser. No. 09/514,189, filed Feb. 28, 2000, hereby incorporated by reference in its entirely, now abandoned. The present application is also related to China application number 99251954.3, filed Dec. 6, 1999, the subject matter of which is hereby incorporated by reference in its entirety.

BACKGROUND OF THE INVENTION

1. Field of The Invention

The invention relates to the field of assembly supports for use on board a ship, and in particular, to a planar assembly support adaptable to mounting a table, chair and apparatus, or instrument working table, for example, to leave behind only a planar shape assembly bed after dismantling.

2. Background Information

At present, assembly supports for tables, chairs and the like, for use on board a ship, which are available on the market are usually composed of a pillar for supporting the chair and a bed or a base for fixing the pillar, where the pillar is a hollow tube. In order to position the pillar with stability on the bed, the bed must have an insertion hole of sufficient height. Thus, the bed is usually made into a thin-shell member with rather high accurate protrusion, or with a portion stretching downward buried under the floor.

After being mounted on a deck or in a cabin, when because of sight or for a temporary change for another use, the chair and pillar are removed, the bed is left behind because it is difficult to dismantle. The bed, in addition to protruding a certain height above the assembly surface, requires in some cases to be provided with mounting holes on the assembly surface, and thus will not only affect activities of people on the deck or in a cabin, but also possibly cause people to be tripped due to carelessness. If a part of the bed is buried under the floor, then holes are required to be drilled on deck and cabin floor surfaces, which is not only time-consuming and strenuous, but may also damage the structural integrity and appearance of the deck or cabin floor.

Therefore, a need exists for an assembly support for a table, chair and the like, for use on board a ship, which overcomes the problems of the known supports.

SUMMARY OF THE INVENTION

It is, therefore, a principal object of the invention to provide a planar assembly support apparatus for supporting a table, chair and the like on board a ship.

It is another object of the invention to provide a planar assembly support apparatus that solves the above mentioned problems of the known supports.

An object of the present invention is to provide a planar assembly support, which is convenient to mount and dismantle, and which leaves behind only planar bed on the mounting surface after dismantling.

These and other objects of the present invention are accomplished by embodiments of a planar assembly support apparatus disclosed herein.

According to an aspect of an exemplary embodiment of the invention, a planar assembly support comprises a pillar, and a bed fixable on a mounting surface, wherein a center hole of said bed is provided with inner screw thread.

According to another aspect of the invention, an inner locking member is provided having, on an outer peripheral face of a lower portion of the inner locking member body, a protruded retaining ring. Further, an outer screw thread is provided on the outer peripheral face of a bottom portion of the inner locking member. The inner locking member can thereby be fixedly locked on the bed through a threaded connecting of the outer screw thread of the bottom portion with the inner screw thread of the center hole of the bed.

According to another aspect of an exemplary embodiment of the invention, the inner and outer screw threads on said bed and inner locking member, respectively, are each two sections of a convex spiral, which are mutually opposite symmetric about a plane made by passing through centerline thereof.

According to another aspect of the invention, a convex spiral length of the inner locking member outer screw thread is equal to or less than the convex spiral length of the inner screw thread of the center hole of the bed.

According to another aspect of the invention, a lower surface of the convex spiral inner screw thread of the center hole of the bed has a downward incline of a certain angle from forward to backward in a clockwise direction, and the upper surface of the inner locking member convex spiral outer screw thread has an upward incline of a certain angle from forward to backward in a clockwise direction. When in a meshed state, the bed convex spiral thread and the inner locking member convex spiral thread are mutually opposite lower and upper surfaces with the same inclination angle.

Thus, according to an exemplary embodiment of the invention, the inner locking member is provided between the pillar and the bed. The bottom of the inner locking member is provided with an outer screw thread in the form of convex spiral, and on the bed is provided inner screw thread in the form of convex spiral able to make a threaded connection with the inner locking member. Therefore, it is possible to make the bed into a substantially planar shape. The pillar and inner locking member can be dismantled together from the bed. Then the bed can be left behind on the mounting surface.

Advantageously, according to the exemplary embodiment of the invention, the bed not only occupies a smaller space than in the known support assemblies, but can also reduce the likelihood that people on the mounting surface will be tripped during normal activities, for example, on the deck or in a cabin.

Further the present invention has advantages of convenient mounting and dismantling, and no damage to mounting surface, etc.

According to another exemplary embodiment of the invention, a planar assembly support includes a pillar assembly and a bed. The pillar assembly includes a pillar comprised of a length of tube, for mounting a table, chair or the like on an upper end thereof. An inner locking member for insertion into a lower end of the pillar is also provided.

According to an aspect of the invention, the inner locking member has an outwardly protruding retaining ring at a lower portion thereof, so that when the inner locking member is inserted into the pillar by placing the lower portion of the pillar over the inner locking member, the lower end of the pillar rests on the outwardly protruding retaining ring.

According to an aspect of the invention, the inner locking member also has an outer screw thread disposed on the lower portion of the inner locking member below the outwardly protruding retaining ring.

According to an aspect of the invention, the inner locking member is fixedly assembled to the pillar so that the pillar and the inner locking member do not move relative to each other.

According to an aspect of the invention, the pillar assembly also includes an outer locking member having a collar portion which receives the pillar therein, with the inner locking member inserted in the pillar.

According to an aspect of the invention, the outer locking member includes an inwardly protruding retaining ring and an outwardly extending flange, at a lower portion thereof. When the pillar with the inner locking member inserted therein is received by the outer locking member, the inwardly protruding retaining ring of the outer locking member extends inwardly some distance beyond the inner locking member retaining ring.

According to an aspect of the invention, the outer locking member is fixedly assembled to the pillar, with inner locking member inserted in the pillar, so that the respective parts do not move relative to each other.

According to an aspect of the invention, an essentially planar bed, which is fixable on a mounting surface, is provided for removably receiving the pillar assembly.

According to an aspect of the invention, the bed has a center hole provided with an inner screw thread which mates with the outer screw thread of the inner locking member of the pillar assembly. In this way, the pillar assembly is removably attached to the bed by inserting the lower end into the bed and turning the pillar assembly in a screwing-on direction.

According to another aspect of this exemplary embodiment of the invention, a mechanism is provided for preventing the pillar assembly, when attached to the bed, from being inadvertently rotated in a screwing-off direction with respect to the bed.

According to an aspect of the invention, the mechanism includes a plurality of indentations provided in the bottom of the outwardly extending flange of the outer locking member of the pillar assembly, and a release member disposed in the bed, and having at least one protrusion disposed thereon.

According to an aspect of the invention, the at least one protrusion configured to extend upward from inside the bed, through an opening in the bed beneath the outer locking member flange, and mate with the plurality of indentations in the bottom of the outer locking member flange.

According to another aspect of the invention, the release member can be operated by a user to selectively disengage the at least one protrusion from the indentations, thereby allowing the pillar assembly to be rotated in the screwing-off direction with respect to the bed.

According to another aspect of the invention, the pillar comprises a metallic tube.

According to another aspect of the invention, the release member comprises a flexible plastic member which is fixed to the bed at an end of the release member opposite the at least one protrusion.

According to another aspect of the invention, the release member has a button portion, disposed between the end which is fixed to the bed and the at least one protrusion, the button portion extending upwards and through an additional hole in the bed, by which the release member can be operated by a user to selectively disengage the at least one protrusion from the indentations by pressing the button portion.

According to another aspect of the invention, the at least one protrusion comprises a plurality of protrusions.

According to another aspect of the invention, the at least one protrusion is formed in the shape of a triangular ramp having a gradual slope upward to a point at which there is a sharp vertical drop downwards. The plurality of indentations are likewise formed in the shape of a series of triangular ramps which mate with the at least one protrusion. In this way, the at least one protrusion slides against the indentations only in the direction of screwing-on of the pillar assembly to the bed, when the at least one protrusion is engaged with the indentations.

DETAILED DESCRIPTION OF THE PREFERRED EMBODIMENT(S)

Figure 1:
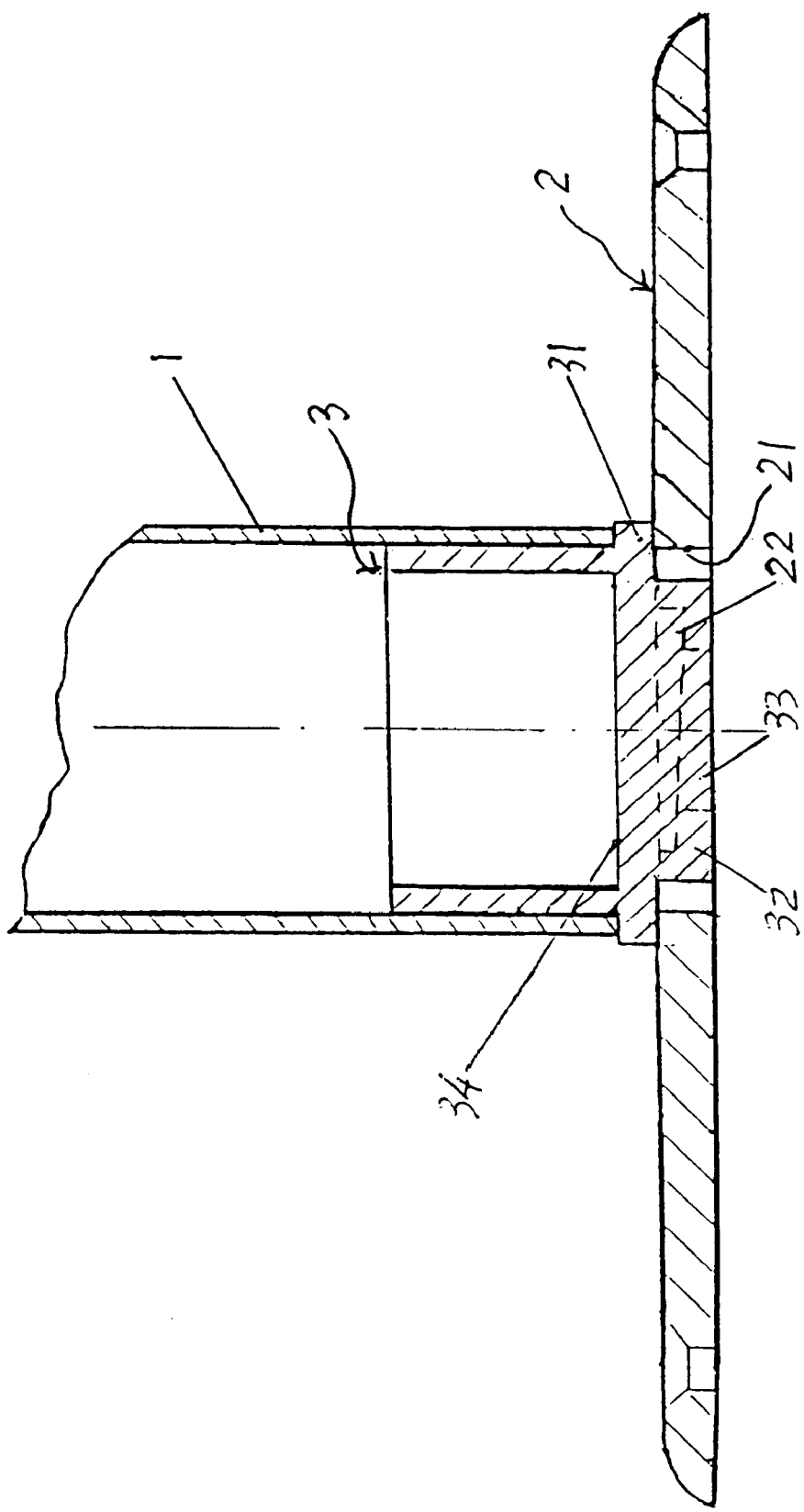
FIG. 1 is a schematic sectional view of the structure of a preferred embodiment of the present invention.
Figure 2:
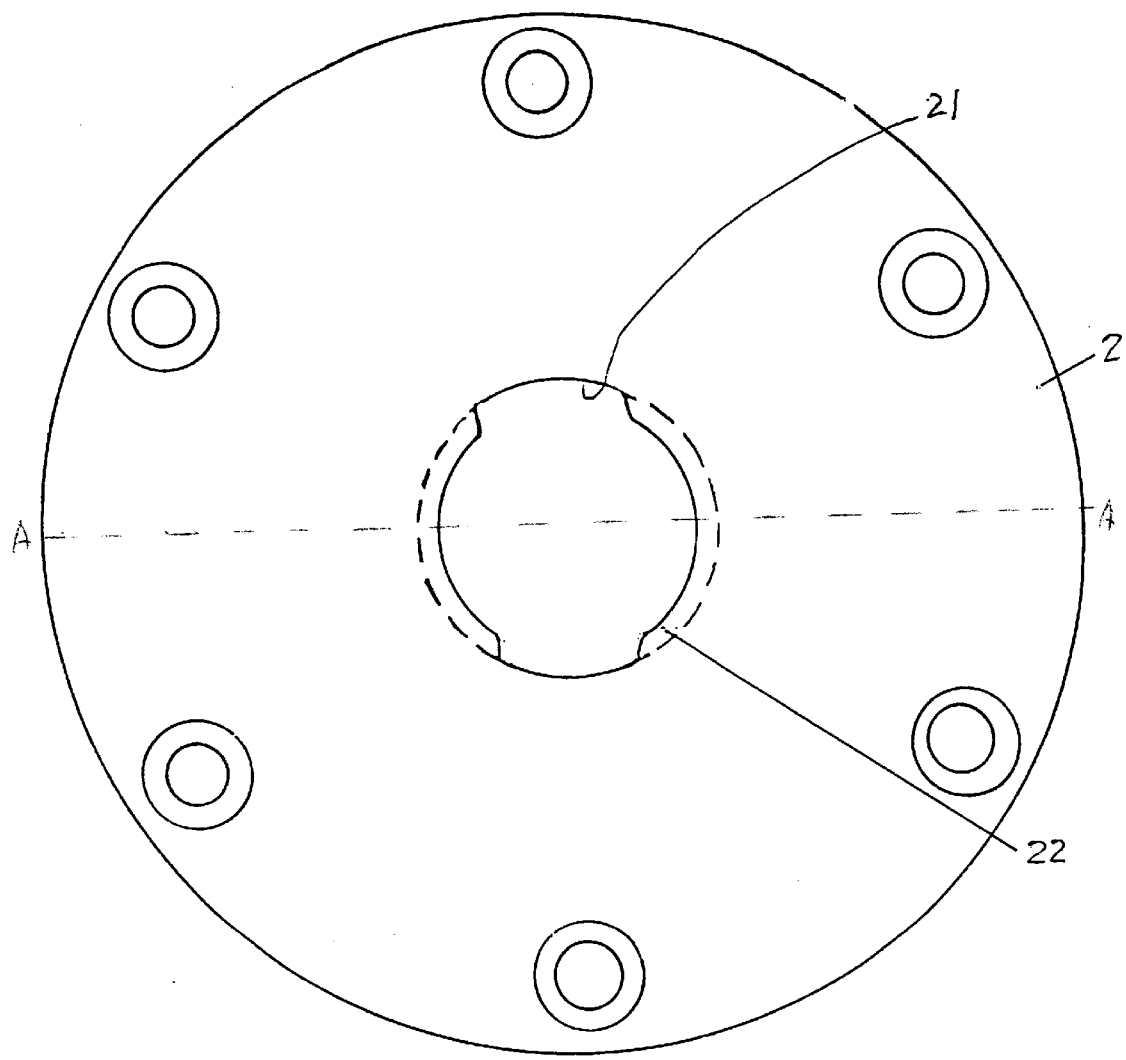
FIG. 2 is a front view of the bed in FIG. 1.
Figure 3:
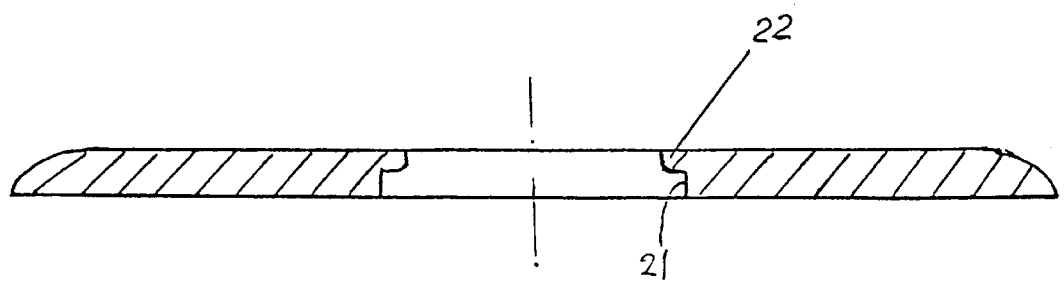
FIG. 3 is the A—A sectional view in FIG. 2.
Figure 4:
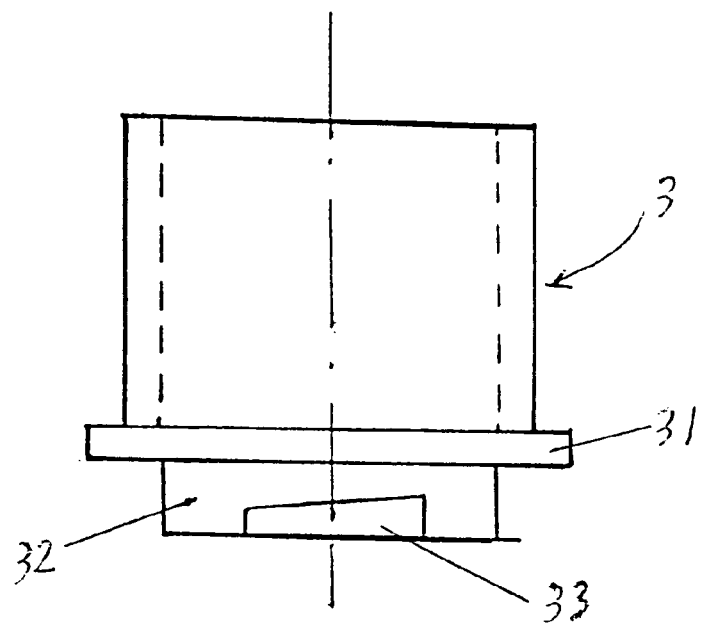
FIG. 4 is a front view of the inner member in FIG. 1.
Figure 5:
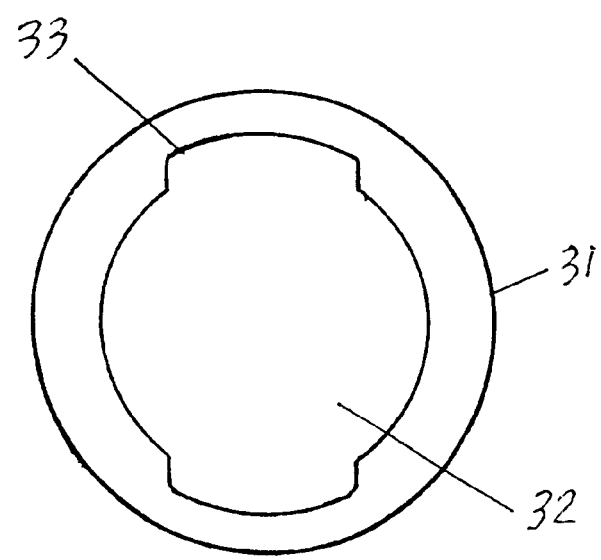
FIG. 5 is a bottom view of FIG. 4.

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Referring now to FIGS. 1 to 3, 4 and 5, a first embodiment of a planar assembly support of the present invention comprises a pillar 1, a bed 2 and an inner locking member 3. The pillar 1 is preferably a section of metallic tube for mounting chair on its upper end.

The bed 2 is made into a substantially planar shape. A center hole 21 is provided in the bed with an inner screw thread 22. In this embodiment, the inner screw thread is preferably formed as at least two sections of convex spiral mutually opposite symmetric about a plane made through centerline thereof.

The inner locking member 3 is provided with a protruded retaining ring 31 on the outer peripheral face of its body, so that when the lower portion of pillar us placed over around the inner locking member, its lower end rests on the retaining ring 31. The outer peripheral face of bottom portion 32 is provided with an outer screw thread 33. The outer screw thread 33 is preferably formed as two sections of convex spiral mutually opposite symmetric about a plane made through centerline thereof. The inner locking member can be fixedly locked on the bed 2 through a threaded connection of the bottom portion outer screw thread 33 thereof with the inner screw thread 22 of bed 2. As can be appreciated by the drawings, this configuration will allow the inner locking member to be fully engaged to the bed by rotating the inner locking member less than ½ turn (i.e., under 180°) relative to the bed.

The convex spiral length of the thread of inner locking member 3 is preferably equal to or less than the convex spiral length of the thread of bed 2, so as to enable the convex spiral of inner locking member 3 to insert into bed 2 through gaps between convex spirals of the bed 2, and to position all of the opposite surfaces tightly under the convex spirals of bed 2.

In order to assure the stability of a threaded connection of the inner locking member 3 with bed 2, the lower surface of convex spirals of the bed 2 has a downward incline of a certain angle from forward to backward in a clockwise direction, and the upper surface of convex spirals of the inner locking member 3 has a upward incline of the same angle as the convex spiral angle of inner locking member 3 from forward to backward in a clockwise direction. Therefore, in a meshed state, the lower surface of convex spirals of the bed 2 and the upper surface of convex spirals of the inner locking member 3 have the same inclination angle.

In addition, the inner locking member 3 is preferably provided with a bottom face 34, to prevent dust and foreign matter from falling into the bed 2.

The above-described embodiment makes use of sections of a convex spiral, preferably at least two sections, constituting less than a complete revolution of a convex spiral. In the above embodiment of a planar assembly support, a pillar 1 and a bed 2 having a center hole 21 and being fixable on an assembly surface are provided. The center hole 21 of the bed 2 is provided with an inner screw thread 22. An inner locking member 3 is further provided, wherein the inner locking member 3 has on an outer peripheral face of a lower portion thereof, a protruded retaining ring 31. The inner locking member 3 also has on the outer peripheral face of the bottom portion thereof, an outer screw thread 33. The inner locking member 3 can be fixedly locked on the bed 2 through a threaded connecting of the outer screw thread 33 of the bottom portion of the inner locking member 3 with the inner screw thread 22 of the bed 2. The outer screw thread 33 of the bottom portion of the inner locking member 3 consists of at least two sections of a convex spiral, the at least two sections of a convex spiral constituting less than a complete revolution of a convex spiral.

An alternative embodiment of the invention will now be described with reference to FIGS. 6–10. Similar features of the prior embodiment described with respect to FIGS. 1–5 will be given the same reference numbers in FIGS. 6–10.

Figure 6:
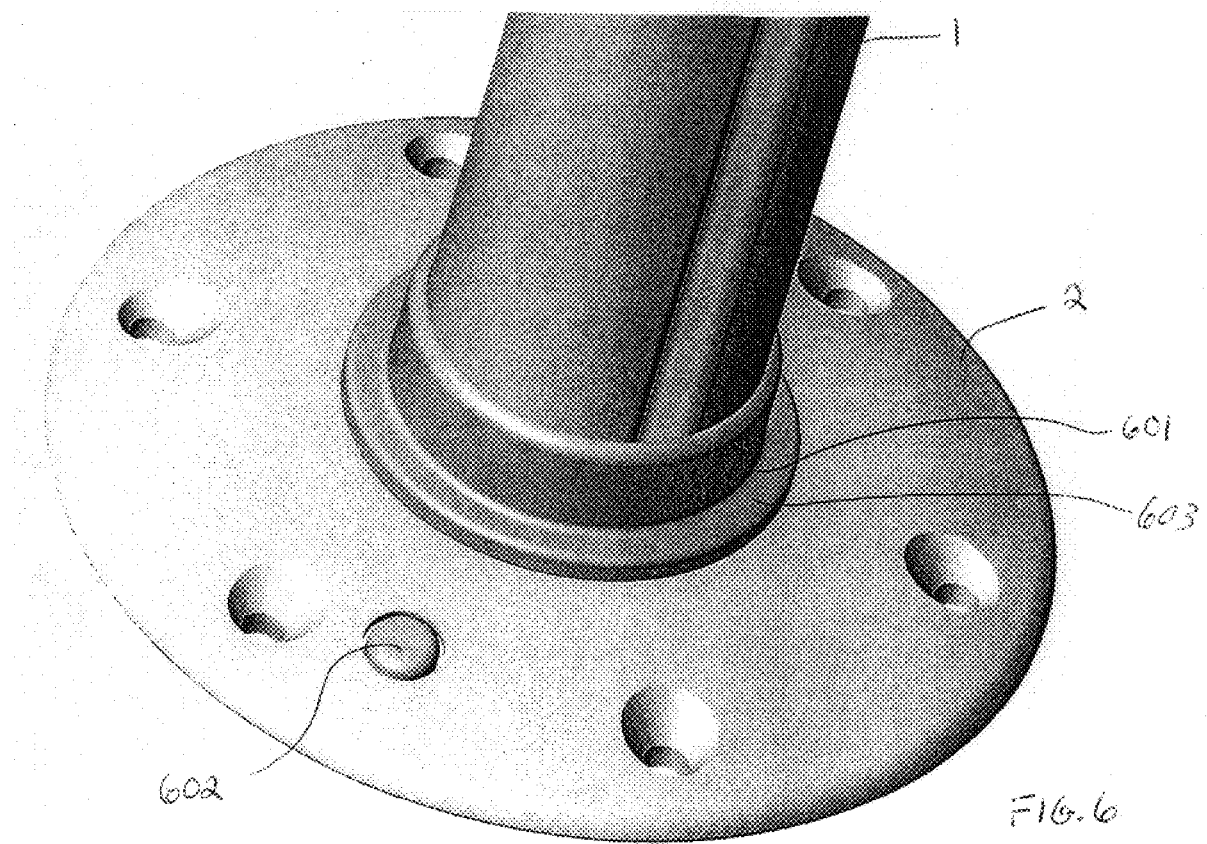
FIG. 6 is a view of another preferred embodiment of the invention.

FIG. 6 shows the bottom portion of a pillar 1 assembled to a bed 2 from an elevation. The pillar 1 is provided as a length of a preferably metallic tube for mounting a table, chair or the like on an upper end (not shown) thereof. The pillar 1 removably attaches to a bed 2, as will be described in detail below. To prevent inadvertent release of the pillar 1 from the bed 2, a lock/release mechanism is provided in this embodiment, which can be released by way of, for example, a depressable button 602 provided in the bed 2. An outer locking member 601 having a lip or flange 603, which will be described in more detail below, is shown in FIG. 6.

Figure 7:
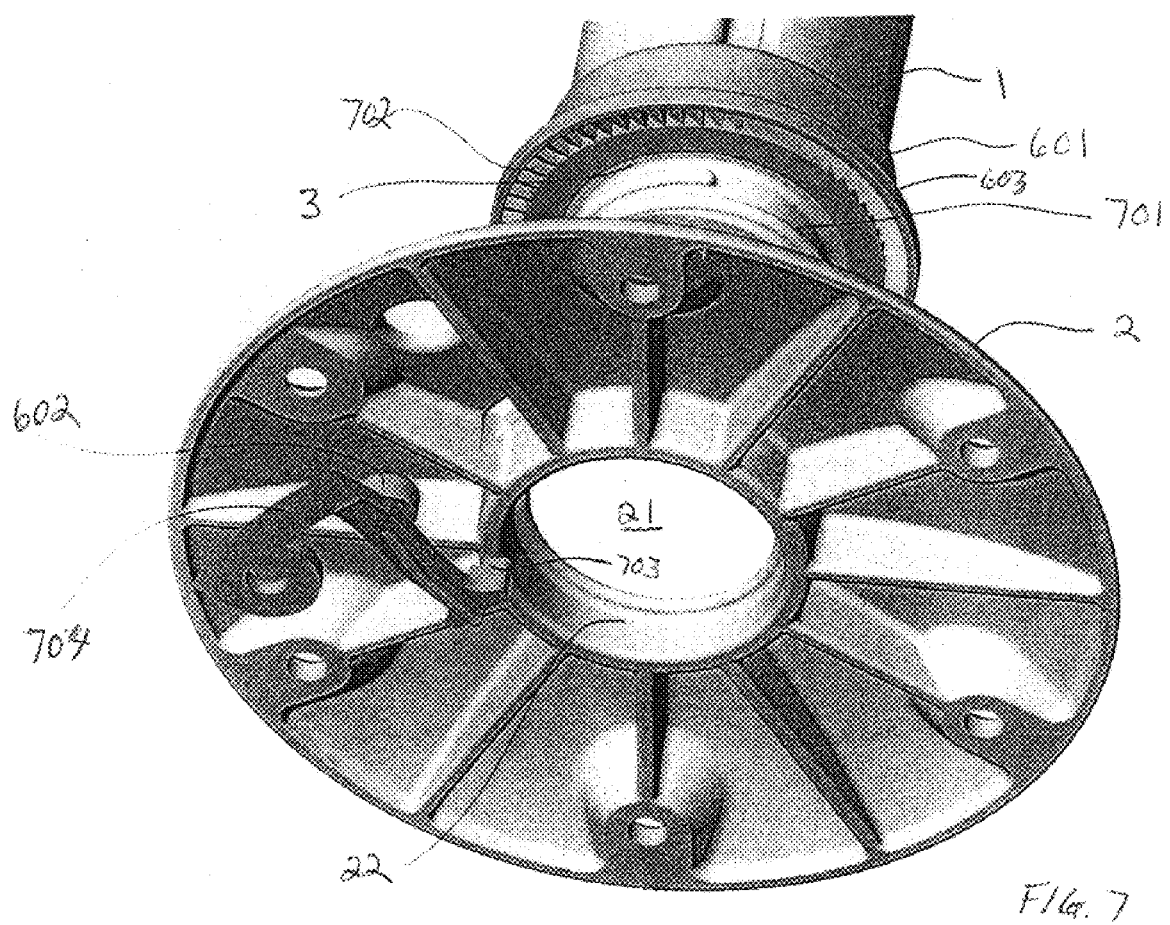
FIG. 7 is a bottom view of the embodiment of FIG. 6 with the pillar assembly detached from the bed.
Figure 8:
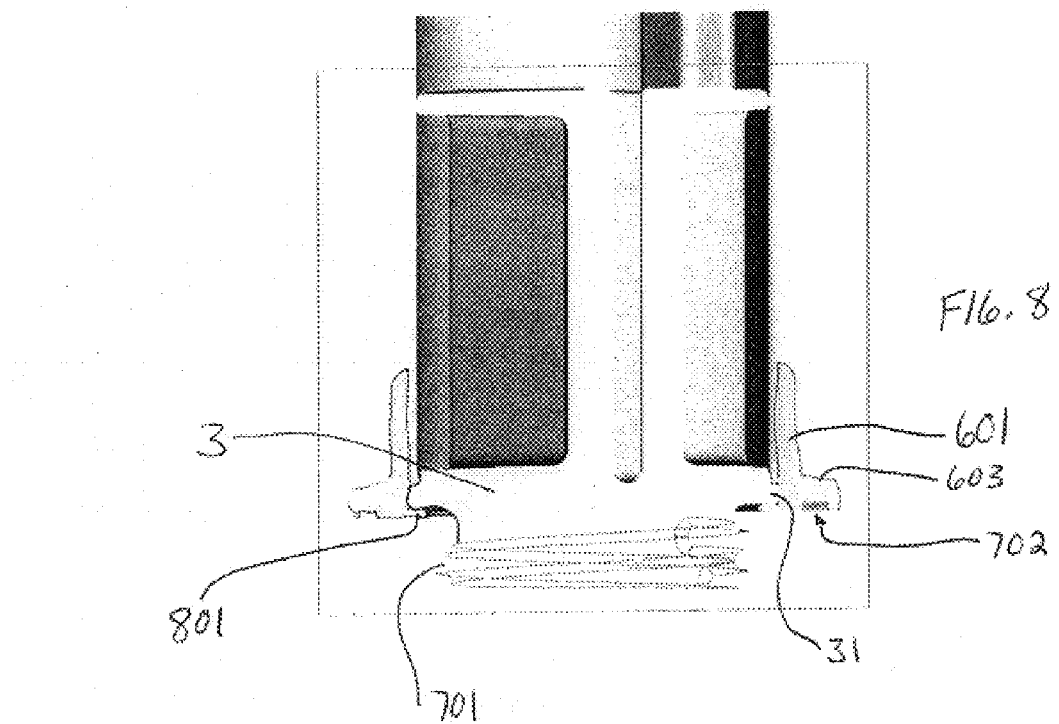
FIG. 8 is a cross-sectional view of the pillar assembly of the embodiment of FIGS. 6–7.
Figure 9:
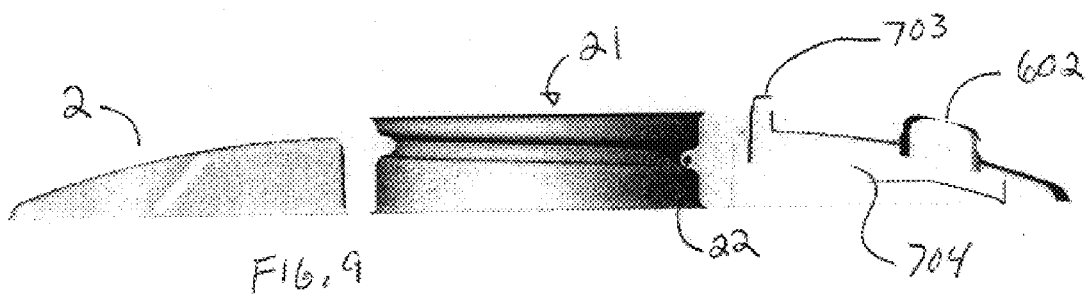
FIG. 9 is a cross-sectional view of a bed according to the embodiment of FIGS. 6–8.

FIG. 7 shows the bottom of the bed 2 with pillar 1 removed therefrom, and FIG. 8 shows a cross-section of the pillar 1 with other components. A lock/release mechanism 704 is also shown detached from the bottom of the bed 2 for purposes of illustration.

With reference to FIGS. 7 and 8, a cylindrical inner locking member 3 is provided for insertion into a lower end of the metallic tube pillar 1. The inner locking member 3 has an outwardly protruding retaining ring 31 at a lower portion thereof, so that when the inner locking member 3 is inserted into the pillar 1 by placing the lower portion of the pillar 1 over the inner locking member 3, the lower end of the pillar 1 rests on the outwardly protruding retaining ring 31. This is probably best seen in the cross-section of FIG. 8.

The inner locking member 3 is fixedly assembled to the metallic tube pillar 1 so that the metallic tube pillar 1 and the inner locking member 3 do not move relative to each other. This can be done in any number of ways as would be apparent to one skilled in the art, for example, pinching inwardly the metallic tube pillar 1 so that the pinched portions of the metallic tube pillar 1 press against the inner locking member 3 in one or more locations. The inner locking member 3 is preferably composed of metal and, therefore, alternatively, the metallic tube pillar 1 and the inner locking member 3 could be soldered or welded together.

In this embodiment, an outer locking member 601 is also provided. The outer locking member 601 has an upwardly extending collar portion which receives the metallic tube pillar 1 with the inner locking member 3 inserted therein. The outer locking member 601 also includes an inwardly protruding retaining ring 801. When the metallic tube pillar 1 with the inner locking member 3 inserted therein is received by the outer locking member 601, the inwardly protruding retaining ring 801 of the outer locking member 601 extends inwardly some distance beyond the inner locking member retaining ring 31. This can be best seen in FIG. 8.

The outer locking member 601 is fixedly assembled to the metallic tube pillar 1 with inner locking member 3 inserted therein so that the respective parts do not move relative to each other. This can be achieved in any number of ways as would be apparent to one skilled in the art and, therefore, need not be discussed herein in detail. The outer locking member 601 may be composed of metal or of plastic material, for example. If formed of plastic material, portions of the collar of the outer locking member 601 could be provided with ridges, for example, which extend inwardly, and mate with is like valleys which could be provided in the metallic tube pillar 1, to thereby provide a relatively rigid and immovable assembly. The outer locking member 601 also has an outwardly extending lip or flange 603 at a lower portion thereof.

The metallic tube pillar 1, the inner locking member 3, and the outer locking member 601 form a pillar assembly (see FIG. 8).

An essentially planar bed 2 is provided for removably receiving the pillar assembly. The bed 2 is fixable on a mounting surface by way of screws, bolts or any number of other fastening methods, as would be apparent to one skilled in the art. For example, any number of through holes, as illustrated, may be provided in the bed 2 through which screws or bolts may be passed.

The bed 2 has a center hole 21 provided with an inner screw thread 22. In this embodiment of the invention, the inner screw thread provided in the center hole 21 of the bed 2 preferably comprises approximately one 360 degree screw thread 22.

The inner locking member 3 of the pillar assembly is provided with an outer screw thread 701 which mates with the inner screw thread 22 provided in the center hole 21 of the bed 2. In this embodiment, the outer screw thread 701 of the inner locking member 3 preferably also comprises approximately one 360 degree screw thread 701.

As should be apparent from the above, the pillar assembly is removably attached to the bed 2 by inserting the lower end into the bed hole 21 and turning the pillar assembly to thereby form a planar assembly support.

A lock/release mechanism for preventing the pillar assembly from inadvertently being rotated and unscrewed from the bed 2 is provided and will now be described with reference to FIGS. 6–9. As already mentioned above, the outer locking member 601 of the pillar assembly has an outwardly extending lip or flange 603 at a lower portion thereof. As part of the lock/release mechanism, the bottom of this lip or flange 603 is provided with a plurality of indentations 702 which mate with at least one corresponding protrusion 703.

A portion of the lock/release mechanism is disposed in the bed 2. In particular, a release member 704 portion of the lock/release mechanism is provided in the bed 2 with the at least one protrusion 703 configured to extend upward from inside the bed 2, through an opening in the bed 2 beneath the outer locking member lip or flange 603, and mate with the plurality of indentations 702 in the bottom of the outer locking member lip or flange 603, such that the pillar assembly can only be rotated in the screwing on direction with respect to the bed 2 when the indentations 702 are engaged by the at least one protrusion 703.

The at least one protrusion 703 is disposed on the release member 704 which can be operated by a user to selectively disengage the at least one protrusion 703 from the indentations 702, thereby allowing the pillar assembly to be rotated in the screwing off direction with respect to the bed 2.

This thereby forms a locking detent arrangement allowing the screwing on of the pillar assembly to the bed 2 and preventing the inadvertent unscrewing of the pillar assembly from the bed 2 until a user has operated the release member 704 to disengage the at least one protrusion 703 from the indentations 702.

There are preferably a plurality of protrusions 703 which engage the plurality of indentations 702 thereby providing a secure locking of the pillar assembly preventing inadvertent rotation in the unscrewing direction with respect to the bed 2.

The at least one protrusion 703 is preferably in the shape of a triangular ramp, or saw-tooth, having a gradual slope upward to a point at which there is a sharp vertical drop downwards, and the plurality of indentations 702 are likewise preferably in the shape of a series of triangular ramps which mate with the at least one protrusion 703, such that the at least one protrusion 703 can slide against the indentations 702 in only one direction, that is, the direction of screwing on of the pillar assembly to the bed 2, when the at least one protrusion 703 is engaged with the indentations 702.

The release member 704 of the lock/release mechanism it preferably has a button shaped portion 602 which protrudes through a hole in the top of the bed 2 such that it can be pressed by a user to cause the at least one protrusion 703 to disengage from the indentations 702 to unlock the pillar assembly for rotation in the unscrewing direction with respect to the bed 2. When the user stops pressing the button shaped portion 602, the lock/release mechanism returns to the locked, that is, engaged, position.

The release member 704 may be formed as a flexible member which can be bent or deformed by user activation/operation to disengage the at least one protrusion 703 from the indentations 702, and which upon deactivation by the user, will return to an engaged position. This can be achieved by forming the release member 704 of a sufficiently flexible plastic or metal material, having the at least one protrusion 703 formed at one end thereof, and being fixed or attached to the bed 2 at an end opposite the at least one protrusion 703. Alternately, the release member could be formed of a rigid material, pivotably attached or fixed to the bed 2 at the end opposite the at least one protrusion 703, and a spring (not shown) provided to urge the at least one protrusion 703 into the engaged position when not depressed by the user into a disengaged position.

What is claimed is:

1. A planar assembly support comprising:

a pillar assembly, which includes:
   a pillar comprised of a length of tube, for mounting furniture on an upper end thereof;
   an inner locking member for insertion into a lower end of the pillar,
     wherein the inner locking member has an outwardly protruding retaining ring at a lower portion thereof, so that when the inner locking member is inserted into the pillar by placing the lower portion of the pillar over the inner locking member, the lower end of the pillar rests on the outwardly protruding retaining ring;
     wherein the inner locking member has an outer screw thread disposed on the lower portion of the inner locking member below the outwardly protruding retaining ring; and
     wherein the inner locking member is fixedly assembled to the pillar so that the pillar and the inner locking member do not move relative to each other;
   an outer locking member having a collar portion which receives therein the pillar, with the inner locking member inserted in the pillar, the outer locking member including an inwardly protruding retaining ring and an outwardly extending flange, at a lower portion thereof;
     wherein, when the pillar with the inner locking member inserted therein is received by the outer locking member, the inwardly protruding retaining ring of the outer locking member extends inwardly some distance beyond the retaining ring of the inner locking member; and
     wherein the outer locking member is fixedly assembled to the pillar, with the inner locking member inserted in the pillar, so that the outer locking member, inner locking member and pillar do not move relative to each other;
an essentially planar bed which removably receives the pillar assembly;
   wherein the bed is fixable on a mounting surface, and
   wherein the bed has a center hole provided with an inner screw thread which mates with the outer screw thread of the inner locking member of the pillar assembly;
whereby the pillar assembly is removably attached to the bed by inserting the lower end into the bed and turning the pillar assembly in a screwing-on direction; and
a mechanism for preventing the pillar assembly, when attached to the bed, from being inadvertently rotated in a screwing-off direction with respect to the bed, including:
   a plurality of indentations provided in the bottom of the outwardly extending flange of the outer locking member of the pillar assembly;
   a release member disposed in the bed, and having at least one protrusion disposed thereon, the at least one protrusion configured to extend upward from inside the bed, through an opening in the bed beneath the outer locking member flange, and mate with the plurality of indentations in the bottom of the flange of the outer locking member;

wherein the release member can be operated by a user to selectively disengage the at least one protrusion from the indentations, thereby allowing the pillar assembly to be rotated in the screwing-off direction with respect to the bed.

2. The planar assembly support according to claim 1, wherein the pillar comprises a metallic tube.

3. The planar assembly support according to claim 1, wherein the release member comprises a flexible plastic member which is fixed to the bed at an end of the release member opposite the at least one protrusion.

4. The planar assembly support according to claim 3, wherein the release member has a button portion, disposed between the end which is fixed to the bed and the at least one protrusion, the button portion extending upwards and through an additional hole in the bed, by which the release member can be operated by a user to selectively disengage the at least one protrusion from the indentations by pressing the button portion.

5. The planar assembly support according to claim 1, wherein the at least one protrusion comprises a plurality of protrusions.

6. The planar assembly support according to claim 1, wherein the at least one protrusion is formed in the shape of a triangular ramp having a gradual slope upward to a point at which there is a sharp vertical drop downwards; and wherein the plurality of indentations are likewise formed in the shape of a series of triangular ramps which mate with the at least one protrusion;

whereby, the at least one protrusion slides against the indentations only in the direction of screwing-on of the pillar assembly to the bed, when the at least one protrusion is engaged with the indentations.

7. The planar assembly support according to claims 1, wherein the release member has a button portion by which the release member can be operated by a user to selectively disengage the at least one protrusion from the indentations by pressing the button portion.

8. The planar assembly support according to claim 1, wherein the outer locking member comprises a plastic material.

* * * * *